Figure 1:
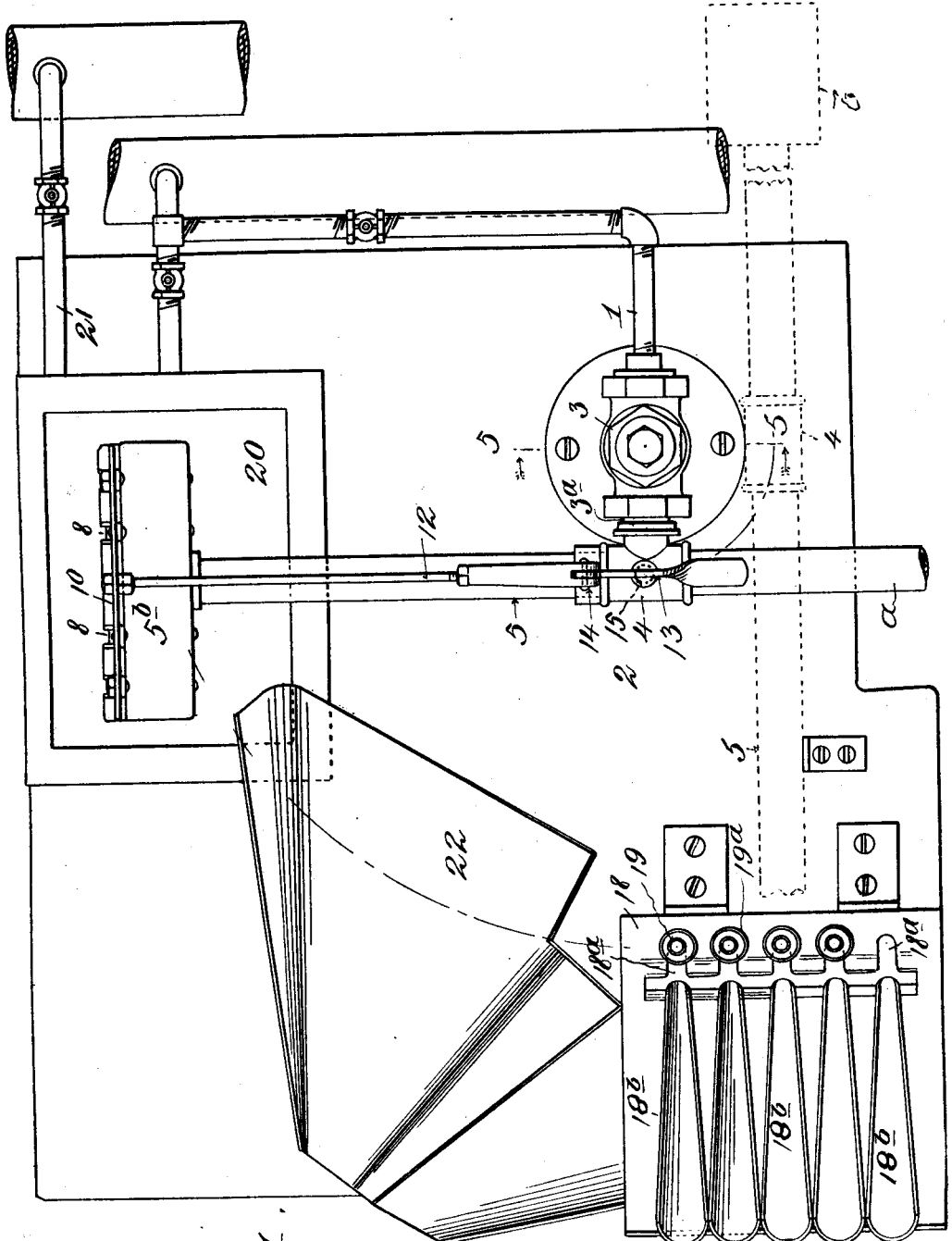

M. KARP.
MEANS FOR SOLDERING SEAMS.
APPLICATION FILED APR. 2, 1912.

1,058,438.

Patented Apr. 8, 1913.
2 SHEETS—SHEET 1.

Witnesses:

Inventor
Morris Karp,
By his Attorney
T. F. Bourne

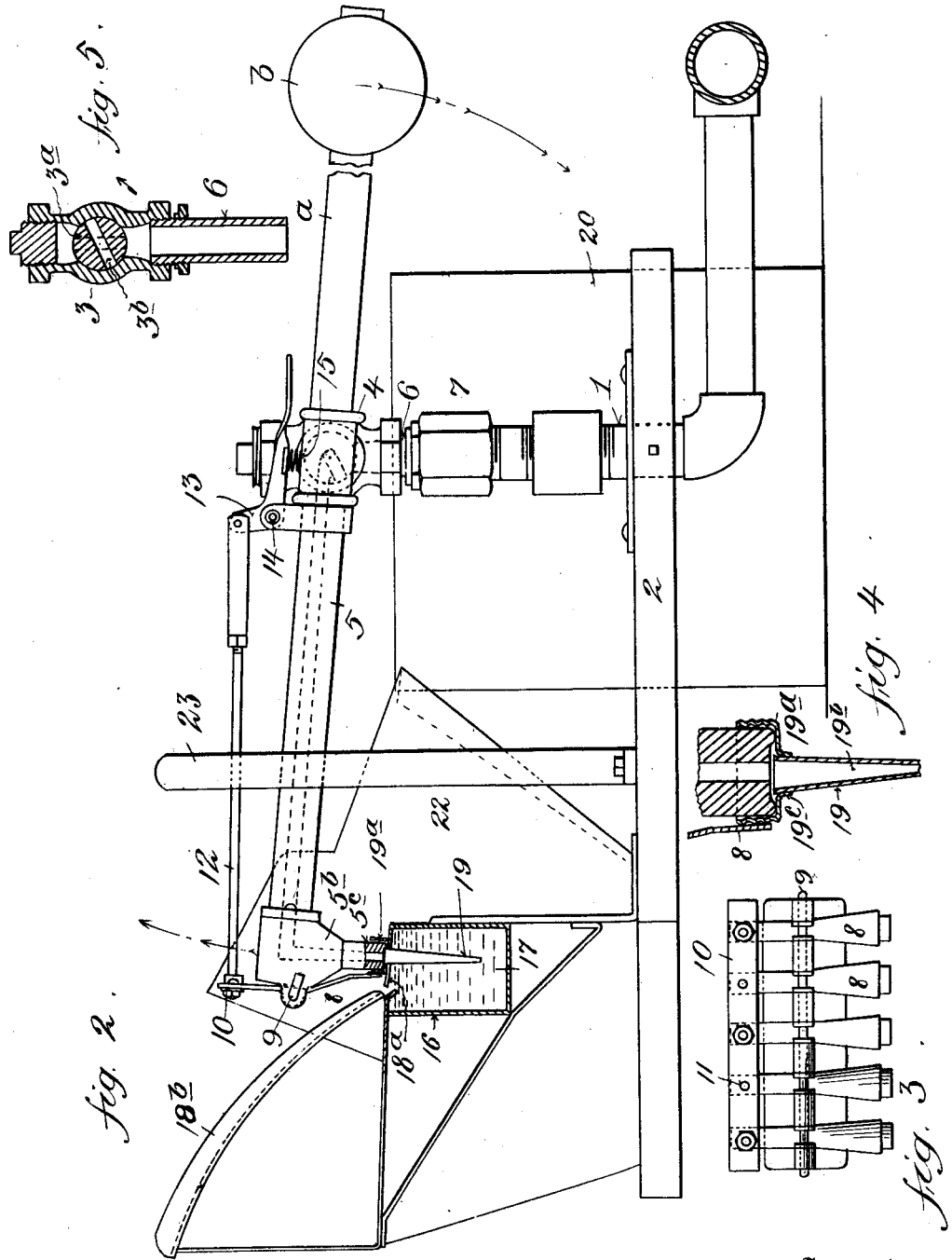

UNITED STATES PATENT OFFICE.

MORRIS KARP, OF PASSAIC, NEW JERSEY, ASSIGNOR TO PASSAIC METAL WARE COMPANY, OF PASSAIC, NEW JERSEY, A CORPORATION OF NEW JERSEY.

MEANS FOR SOLDERING SEAMS.

1,058,438.

Specification of Letters Patent. Patented Apr. 8, 1913.

Application filed April 2, 1912. Serial No. 688,021.

*To all whom it may concern:*

Be it known that I, MORRIS KARP, a citizen of the United States, and resident of Passaic, in the county of Passaic and State of New Jersey, have invented certain new and useful Improvements in Means for Soldering Seams, of which the following is a specification.

The object of this invention is to provide simple and efficient means capable of readily soldering seams on articles, such as tubes and spouts and other hollow or tubular articles, and also capable of soldering caps or other parts to tubes, spouts and the like.

My improvements enable the seam of a tube or spout and the seam between the tube or spout and a cap to be soldered at one operation, and excess solder that might accumulate upon the soldered parts may be blown away and the parts cooled at one operation. Spouts or nozzles for cans and other containers are frequently made of sheet metal in tapering form, with a screw cap at the larger end, and soldering of the seam, and also soldering of the spout and cap together is frequently done by hand operation, but that is costly and not always accurate. The same may be carried out in my machine expeditiously and accurately.

My invention comprises novel details of improvement that will be more fully hereinafter set forth and then pointed out in the claims.

Reference is to be had to the accompanying drawings forming part hereof, wherein, Figure 1 is a plan view of a soldering machine embodying my invention; Fig. 2 is a side elevation, partly in section; Fig. 3 is an end view of the spout gripper, looking from the left in Fig. 2; Fig. 4 is an enlarged detail section, illustrating the spout being gripped, and Fig. 5 is a detail section through the valve mechanism on the line 5, 5, in Fig. 1.

Similar numerals of reference indicate corresponding parts in the several views.

At 1 is a pipe for supplying air under pressure from any suitable source, which pipe is shown secured upon a table or the like 2. Said pipe is provided with a valve 3 having a rocking stem $3^a$, to which a coupling 4 is shown secured, a pipe 5 being secured to said coupling. Valve 3 is mounted to rotate, for which purpose a tube 6 is shown attached to the lower part of said valve and suitably journaled in a coupling 7 at the upper end of pipe 1. The arrangement of port $3^b$ of stem $3^a$ is such that when pipe 5 is in a lowered position the flow of air through said pipe will be cut off (see Fig. 5), but when said pipe is raised to an elevated position, the port $3^b$ will register with tube 6 and thus permit the flow of air from tube 6 through pipe 5. Pipe 6 is shown provided with an extension $a$ having a counter weight $b$. Pipe 5 is provided with a head $5^b$ having any desired number of outlets or nozzles $5^c$ in communication with pipe 5.

At 8 are grippers or fingers having their lower ends opposed to the respective outlets $5^c$ and pivotally supported upon head $5^b$, as by the shaft 9, so that all of said grippers or fingers may be operated simultaneously. The grippers or fingers 8 are connected with a bar or the like 10, as by the rivets or the like 11, which bar is shown connected by rod 12 with a rock arm 13 pivotally supported upon pipe 5 at 14. A spring 15 serves normally to cause the grippers or fingers 8 to be pressed toward the outlets $5^c$.

At 16 is a tank or bath of soldering flux or acid 17. Over said tank is a rest 18 for the articles, such as tubes or spouts 19 that are to be soldered. Said rest is shown in the form of a plate having slots $18^a$ through which the tubes or spouts pass into the soldering flux.

At $18^b$ are inclined chutes, the lower ends of which terminate over the slots $18^a$ so that the tubes, spouts or the like that are placed in the chutes $18^b$ will slide down into said slots and depend from plate 18 into the flux.

An upright 23 extending from table 2 is shown located in position to limit side swing of pipe 5 so that its outlets $5^c$ will be properly brought over the caps $19^a$ to enter the latter. At a suitable distance from the tank 16 is a tank 20 to contain molten solder, which may be kept molten by any suitable means, such as by gas burners supplied from gas pipe 21.

At 22 is a receiving chute for the soldered articles.

The tubes or spouts 19 shown are of any well known construction, and are shown adapted to pass through the screw threaded caps $19^a$ to be soldered to the tubes or spouts, although soldering of the seams of other articles may be accomplished by the machine. In the operation of a machine of the example illustrated, an attendant passes the tubes or spouts through the holes in the caps and slides them down the chutes 18ᵃ so that they may rest in the slots of the rest 18 (see Fig. 2) dipping into the fluid flux. When the articles to be soldered are in such position an attendant operates lever 13 to cause grippers or fingers 8 to move away from the outlets 5ᶜ, and he swings pipe 5 over caps 19ᵃ as indicated in Fig. 2, and then releases the grippers which grasp the caps and hold them against the outlets. The attendant then raises pipe 5 and carries the attached outlets out of the tank 16, and swings said pipe around over bath 20 and then depresses the articles to be soldered into the molten solder in said bath. The attendant next raises pipe 5 with the attached soldered articles into such position as to cause the port 3ᵇ of valve stem 3ᵃ to register with tube 6 and thereupon air under pressure is blown through pipe 5, nozzles 5ᶜ and the attached soldered articles, with the result of blowing from the spouts solder that may have accumulated therein, and also cooling the solder upon the articles. After the air has thus been blown through the articles the operator swings pipe 5 downwardly to cut off the air flow, lowers the same over chute 22, and then operates lever 13 to release the soldered articles which slide down the chute, and the operations stated are repeated.

The dipping of the articles into the molten solder not only solders the seams thereof, but also solders parts of the articles together. If the articles stick at the outlets or grippers, the same may be dislodged by striking them against chute 22. If beads of solder collect at the lower ends of the tubes, spouts or the like they may be redipped in the molten bath to cause removal of such beads of solder, and the air blown through to accomplish the final result.

By means of my invention it will be understood that several articles may be soldered simultaneously, and excess solder removed therefrom in a simple, accurate and expeditious manner, thereby shortening the time ordinarily required for soldering such articles by hand and producing properly soldered seams and joints.

Changes may be made in the details and arrangement of parts set forth, within the scope of the appended claims, without departing from the spirit of the invention.

Having now described my invention what I claim is:—

1. A soldering machine comprising a bath for molten solder, a pipe provided with means for dipping articles into and removing them from the solder bath, and means for directing the flow of fluid through said pipe against the soldered articles as they are raised from the solder bath.

2. A soldering machine comprising a bath for soldering flux, a bath for molten solder, a pipe provided with means for dipping articles into and removing them from said baths successively, and means for directing the flow of fluid through said pipe against the soldered articles as they are raised from the solder bath.

3. A soldering machine comprising a bath for molten solder, means for dipping apertured articles into and removing them from the solder bath, and means for blowing fluid through said soldered articles to remove excess solder therefrom.

4. A soldering machine comprising a bath for molten solder, means for dipping apertured articles into and removing them from the solder bath, and means for blowing fluid through said articles as they are raised from the solder bath to remove excess solder therefrom.

5. The combination of a pipe, means to supply air thereto, means for suspending articles from said pipe, a tank to receive said articles, and means to permit said pipe to be swung over and away from said tank.

6. The combination of a pipe, means to rotatively support the pipe and supply air thereto, means carried by the pipe for suspending articles therefrom, and a bath for molten solder to receive articles depending from the pipe.

7. The combination of a pipe, means to rotatively support the pipe and supply air thereto, means carried by the pipe for suspending tubes therefrom, a bath for acid to receive said tubes, and a bath for molten solder to receive tubes depending from the pipe.

8. The combination of a pipe, a swiveled valve having a stem, means connecting said stem with said pipe to permit up and down movements of the latter, means carried by the pipe to support tubes, and a bath for molten solder in position to receive tubes supported by the pipe.

9. The combination of a pipe, a swiveled valve having a stem, means connecting said stem with said pipe to permit up and down movements of the latter, said pipe having a head provided with outlets, means for suspending tubes at said outlets, and a tank for molten solder in position to receive tubes supported by said head.

10. The combination of a pipe, means to supply said pipe with air and permit the pipe to be raised and lowered and swung about, said pipe having a head provided with one or more outlets, grippers carried by the head to coact with said outlets to support tubes in line therewith, means to operate said grippers, and a tank for molten solder in position to receive tubes suspended from said head.

11. The combination of a pipe, means to supply said pipe with air and permit the pipe to be raised and lowered and swung about, said pipe having a head provided with one or more outlets, one or more grippers carried by the head to coact with said outlets to support tubes in line therewith, means to operate said grippers, a tank for acid in position to receive tubes suspended from said head, and a tank for molten solder in position to receive tubes suspended from said head.

12. The combination of a pipe provided with one or more outlets, means to supply the pipe with air in one position and cut off the air flow in another position, means to suspend tubes at such outlets, a tank for acid provided with means to suspend tubes thereover, and a bath for molten solder adapted to receive tubes suspended from said outlets.

13. The combination of a pipe, means to movably support said pipe to swing sidewise and upwardly, means to permit the flow of air through said pipe when in an upward position and to cut off the flow of air when in a lowered position, a head connected with said pipe, said head having one or more outlets, one or more grippers movably supported by said head to coact with said outlets, a rod connected with said grippers, a lever connected with the rod and pivotally carried by said pipe, and a bath for molten solder in position to receive tubes suspended from said head.

14. The combination of a pipe, means to movably support said pipe to swing sidewise and upwardly, means to permit the flow of air through said pipe when in an upward position and to cut off the flow of air when in a lowered position, a head connected with said pipe, said head having one or more outlets, one or more grippers movably supported by said head to coact with said outlets, a rod connected with said grippers, a lever connected with the rod and pivotally carried by said pipe, a tank, means to suspend tubes over said tank in position to receive the outlets of said head, and a bath for molten solder in position to receive tubes suspended from said head.

Signed at Passaic, in the county of Passaic, and State of New Jersey, this twenty first day of March A. D. 1912.

MORRIS KARP.

Witnesses:
W. F. GASTON,
FRED W. GASTON

Copies of this patent may be obtained for five cents each, by addressing the "Commissioner of Patents, Washington, D. C."